(12) United States Patent
LeCroy

(10) Patent No.: US 6,311,822 B1
(45) Date of Patent: Nov. 6, 2001

(54) METHOD AND APPARATUS FOR HIGH SPEED ARTICLE PROCESSING

(75) Inventor: Donald L. LeCroy, Mableton, GA (US)

(73) Assignee: Jervis B. Webb Company, Farmington Hills, MI (US)

(*) Notice: Subject to any disclaimer, the term of this patent is extended or adjusted under 35 U.S.C. 154(b) by 0 days.

(21) Appl. No.: 09/262,829

(22) Filed: Mar. 5, 1999

Related U.S. Application Data

(60) Provisional application No. 60/082,608, filed on Apr. 22, 1998.

(51) Int. Cl.$^7$ .................................................. B65G 43/08
(52) U.S. Cl. ........................ 198/358; 198/349; 198/347.1
(58) Field of Search ............................. 198/347.1, 347.4, 198/370.03, 370.04, 370.07, 349, 360, 358, 349.7

(56) References Cited

U.S. PATENT DOCUMENTS

| | | |
|---|---|---|
| 3,260,349 | 7/1966 | Vander Meer . |
| 3,561,623 | 2/1971 | McCaul et al. . |
| 3,865,226 | 2/1975 | Scata . |
| 3,880,298 * | 4/1975 | Habegger et al. ............... 198/349 X |
| 4,244,672 * | 1/1981 | Lund ................................. 198/358 X |
| 4,397,384 * | 8/1983 | Nohren, Jr. ...................... 198/358 X |
| 4,770,122 * | 9/1988 | Ichihashi et al. ................. 198/349 X |
| 4,811,830 | 3/1989 | Felder . |
| 5,301,790 * | 4/1994 | Prydtz et al. ......................... 198/349 |
| 5,308,001 * | 5/1994 | Grecksch et al. ............. 198/347.4 X |
| 5,566,834 | 10/1996 | Prydtz et al. . |
| 5,575,375 * | 11/1996 | Sandusky et al. ................... 198/358 |
| 5,903,464 * | 5/1999 | Stingel, Jr. et al. .......... 198/347.1 X |

FOREIGN PATENT DOCUMENTS

| | | |
|---|---|---|
| 14 81 277 A | 1/1969 | (DE) . |
| 2 224 147 A | 4/1990 | (GB) . |

* cited by examiner

*Primary Examiner*—James R. Bidwell
(74) *Attorney, Agent, or Firm*—Dickinson Wright PLLC

(57) ABSTRACT

A baggage handling system includes a plurality of baggage trays for carrying baggage and a conveyor for transporting the trays at a given speed. A diverter selectively removes baggage from the conveyor and positions the baggage on an accumulator. An unloader is provided to unload the baggage from the accumulator. The accumulation in one mode slows baggage as received from the conveyor and presents the slowed baggage to an unloading device at a generally constant rate, such a rate being dependent of the rate at which the baggage is diverted from the conveyor. The unloader uses a tipping mechanism employing wheel guides an and actuator for gentle tipping of the baggage from the accumulator to another zone such as a make-up area in an airport baggage handling system.

28 Claims, 6 Drawing Sheets

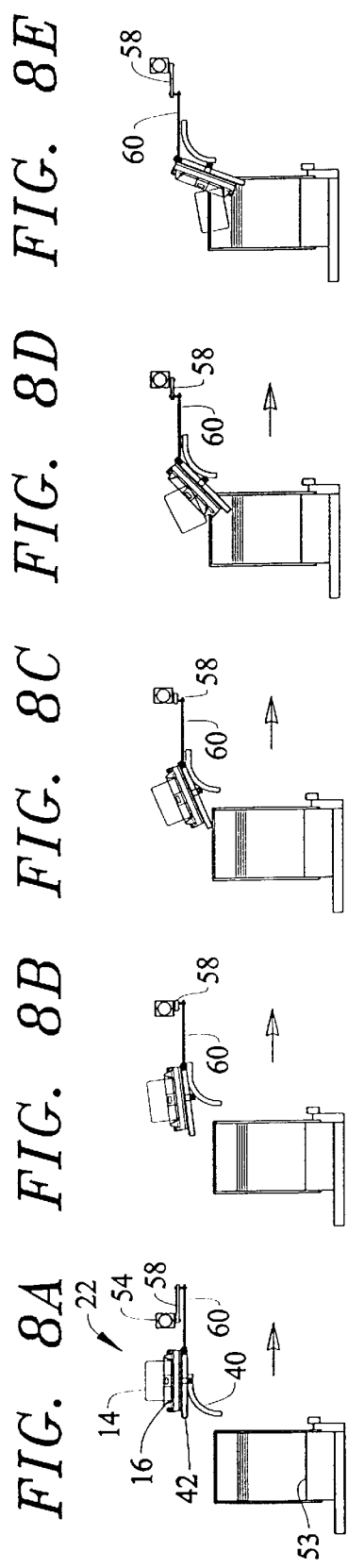
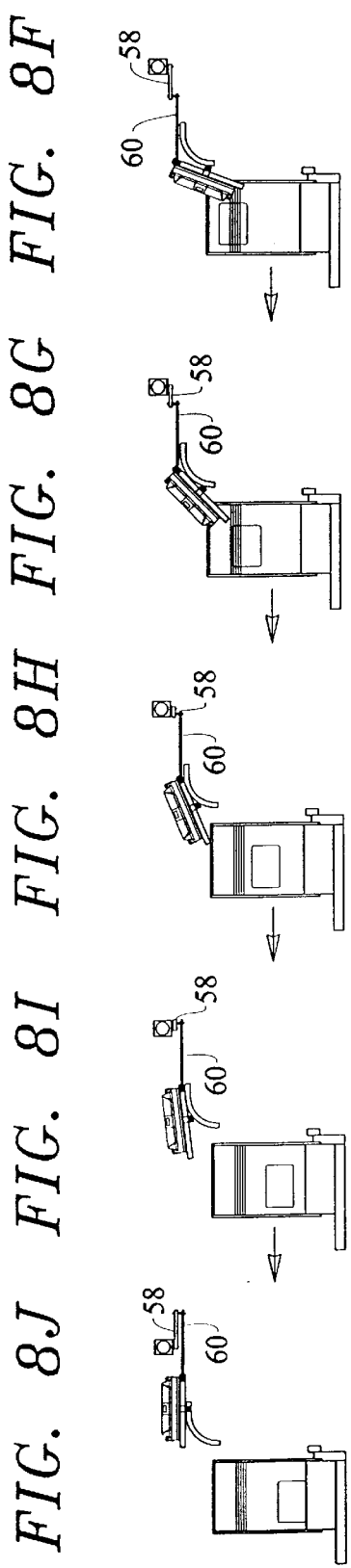

METHOD AND APPARATUS FOR HIGH SPEED ARTICLE PROCESSING

This application claims priority under 35 USC § 119(e) based on provisional Ser. No. 60/082,608, filed on Apr. 22, 1998.

The present invention is directed toward a method and apparatus for article handling, and more specifically, toward a method and apparatus for cargo processing and sorting which presents items to a processing station in a controlled manner.

BACKGROUND OF THE INVENTION

Conveyor systems are widely used for transporting materials from one point to another. In factories, conveyors carry objects along assembly lines from one processing point to the next, bring materials out of storage and return finished products to warehouse locations. In airports, conveyors are used to move baggage and other cargo from ticketing counters to make up areas where the items are placed onto trucks and carried to waiting planes. Conveyors are also used to bring items from a plane to a baggage claim area inside an airport terminal. These systems can be quite long, move at a wide range of speeds and be arranged in many difference configurations.

When objects such as baggage arrive at a final or intermediate destination, they must generally be brought to rest before being further processed. At low speeds, the objects may fall off the end off the conveyor into a pile for further manual processing, or they may be pushed laterally off the conveyor by a diverter or pusher. When the objects are carried in a tray or other carrier, such as is commonly done with baggage, a device such as a tipper must be provided to tip or otherwise remove the baggage from the carrier. Baggage is relatively durable, and such treatment does little harm. However, when the baggage or other objects are moving at high speeds, it cannot safely be tipped or dropped from the conveyor. The kinetic energy of the moving baggage must be absorbed in order to stop the object, and when the energy is absorbed by the bag itself or other nearby bags, damage often occurs. Tippers operating at high speeds can also damage baggage. In addition, when baggage is to be manually processed after leaving the conveyor, the potential for injury to persons working near the terminal end of the conveyor is high. Finally, if items of baggage arrive in quick succession at a station, it can be difficult for the persons processing the items to work efficiently. However, slowing down a conveyor also results in a lower throughput and reduces efficiency. Therefore, systems today generally operate at a relatively high speed, and safety precautions must be taken to minimize damage to the baggage or other objects leaving the conveyor and injury to individuals working near the conveyor.

SUMMARY OF THE INVENTION

The present invention addresses these and other problems by providing an article handling system that includes a high speed conveyor for transporting objects, a diverter for selectively removing objects from the high speed conveyor, an accumulation conveyor for receiving objects from the high speed conveyor, and an unloading device for removing articles from the accumulation conveyor, which device may be a tipper when the articles are carried on the conveyors in trays. The accumulation conveyor slows the articles leaving the high speed conveyor and presents them to the unloading device at a generally constant rate, a rate independent of that at which the objects are diverted from the conveyor.

In addition, the invention comprises a novel tipper mechanism that gently tips articles from the conveyor with a smooth, non-jarring motion and which is of a simpler construction than tippers heretofore known. The tipper is highly useful in connection with the subject article handling system, but can also be used quite effectively in most other situations where a baggage tipper is called for, and even in some applications where previous tippers would have been too violent or too expensive to maintain. The tipper includes a generally horizontal platform having a front edge and a rear edge and a holder for holding a container on said platform. The platform has a first platform support and a guide for guiding said first platform support. The guide has a first end at a first level and a second end at a second level, the second level being lower than the first level. A second platform support supports the rear edge at a level higher than the second level. An actuator is positioned to move the platform and the first platform support along the guide until the front edge support reaches the second end of the guide.

The present invention also includes a method of handling baggage comprising transporting baggage trays carrying baggage on a conveyor at a first speed and diverting at least a portion of the baggage trays transported on the conveyor to an accumulation buffer to form an accumulated line. The baggage is unloaded from the diverted trays at a second speed independent of the speed of the conveyor. The trays can be then removed from the accumulation line after baggage unloading. The second speed can be at a generally constant rate to enhance unloading. The unloading can include tipping each tray to unload the baggage. During tipping, a forward portion of the tray can travel along an arcuate and downward path during unloading, and a rearward portion of the tray can travel in a generally horizontal path during unloading.

The present invention is particularly useful in connection with baggage handling systems such as those used in airports, and for simplicity, the invention will be described herein in terms of an airport baggage handling system. It should be understood, however, that this invention is not limited to airport applications and could be used in connection with any article handling system in which the gentle handling of articles is required.

It is therefore the principal object of the present invention to provide an article handling system for minimizing damage to the articles being processed.

It is another object of the present invention to provide an improved tipping device for tipping objects from a tray.

It is a further object of the invention to provide a baggage handling system which includes an accumulation buffer between a high speed baggage conveyor and a baggage tray tipper to allow the tipper to operate at a rate independent of the rate of the high speed conveyor.

It is still another object of the present invention to provide a baggage handling system in which baggage trays are routed to an appropriate processing station, emptied of their contents, and automatically carried to a storage location where they can be retrieved for further use.

It is still a further object of the present invention to provide an improved baggage tray tipper that is driven by the rotation of a rotary motor.

BRIEF DESCRIPTION OF THE DRAWINGS

These and other objects of the invention will be better appreciated from a reading and understanding of the following detailed description of the preferred embodiments of the invention together with the following drawings of which:

FIGS. 8A–8J are side elevational views of the tipper of FIG. 2 showing the tipper moving through one complete operational cycle;

DESCRIPTION OF THE PREFERRED EMBODIMENTS

Figure 1:
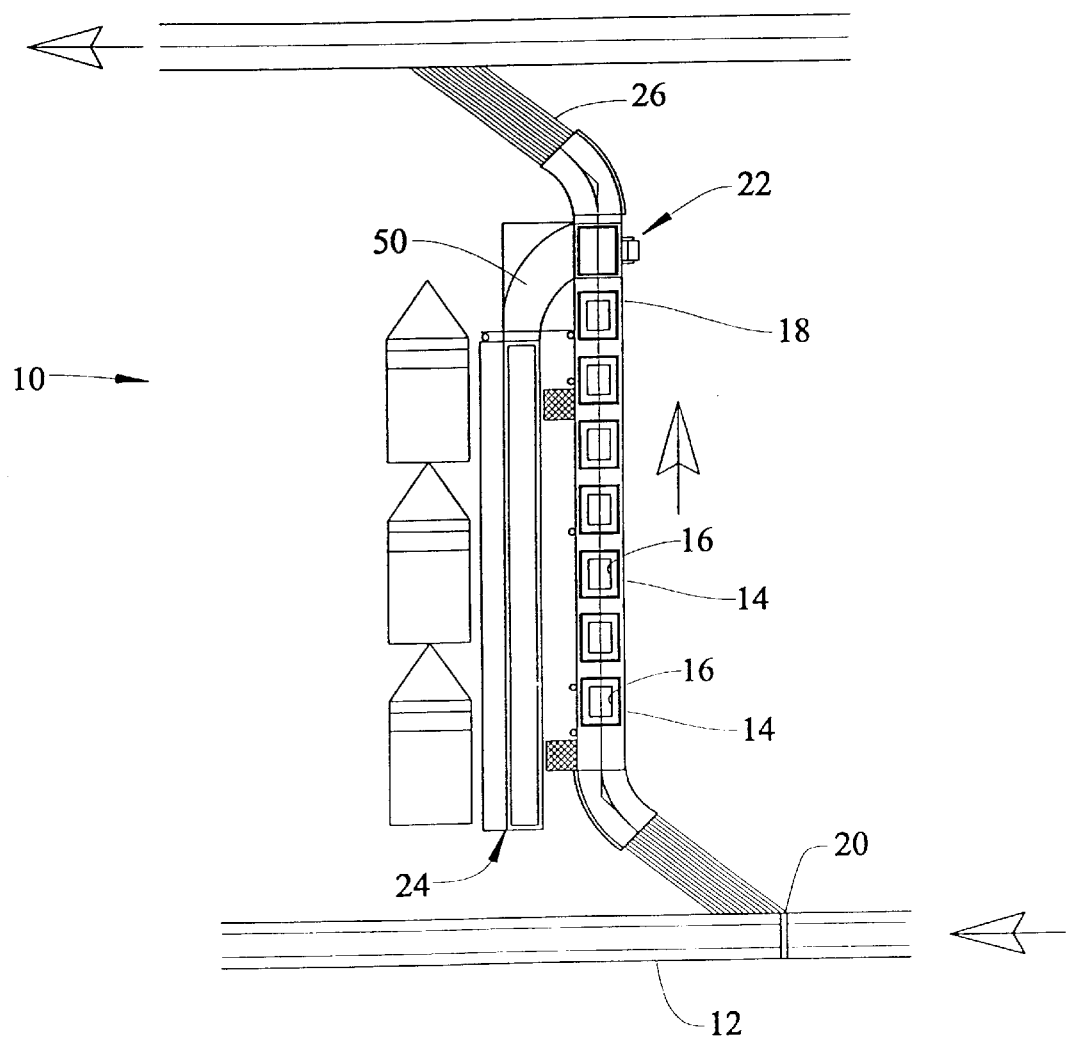
FIG. 1 is a plan view of a baggage handling system according to the present invention which system includes a baggage tray tipper.
Figure 7:
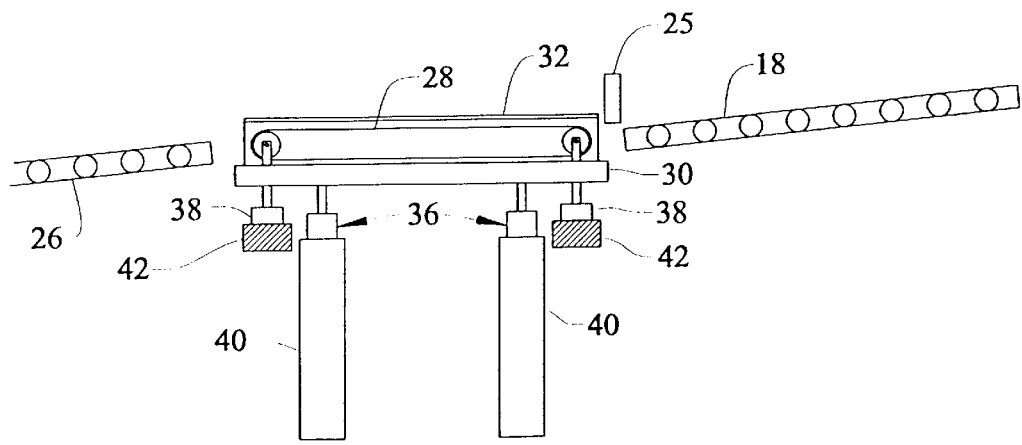
FIG. 7 is a front elevational view of the tipper shown in FIG. 2.

In a preferred embodiment of the subject article handling system 10, as seen in FIG. 1, the invention comprises a high speed conveyor line 12 for carrying baggage trays 14 holding items of baggage or other cargo 16, at least one accumulation conveyor 18, a high speed diverter 20 for selectively diverting trays 14 from the high speed line 12 onto one of the accumulation conveyors 18, and a tipper 22 for receiving trays 14 from the accumulation line 18 and tipping the baggage 16 out of the trays 14 into one of the make-up areas 24 of the airport for further processing. The high speed conveyor 12 is preferably a belt conveyor, and the accumulation conveyor 18 may be a zero-pressure accumulation conveyor, or an accumulation conveyor of simpler construction that allows the trays to impact against one another. A stop 25, shown in FIG. 7, is provided at the end of the accumulation conveyor before the tipper 22 to prevent the trays 14 from moving onto the tipper 22 until called for. This arrangement allows the tipper 22 to operate at a steady pace and to tip objects gently into the make up area. When trays 14 are diverted from the high speed line 12 at a pace faster than that tipper 22 is set to operate, the trays 14 accumulate upstream from the tipper 22 without affecting the pace of the tipper or slowing down the high speed line. The length of the accumulation conveyor 18 will depend on the rate of the high speed line 12, the operating rate of the tipper 22, and the number of baggage trays 14 that can normally be expected to arrive at the accumulation line 18 in a given length of time. In a typical airport setting, for example, it may be know that approximately 180 trays are expected to arrive at a given make-up area 24 over a 30 minute period, a rate of approximately six trays per minute. The tipper 22 may operate safely at a rate of six bags per minute or higher, and therefore the buffer need only be long enough to accommodate surges in the number of trays. An additional conveyor 26 is located downstream from the tipper 22 to receive empty baggage trays 14 and to transport them to a storage location (not shown) or return them to ticket counters or other locations where they are needed.

Figure 2:
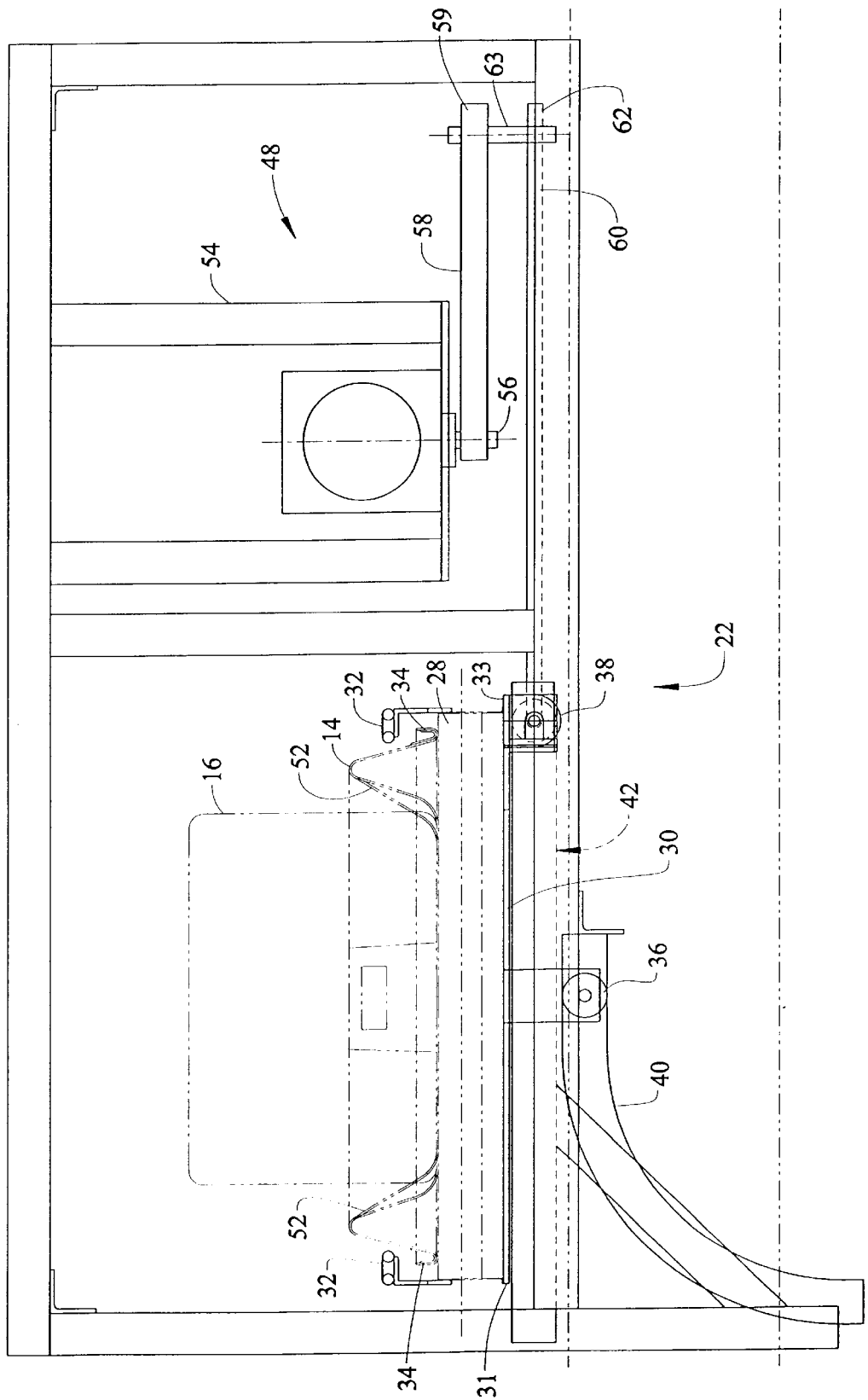
FIG. 2 is a side elevational view of the tipper shown in FIG. 1.
Figure 3:
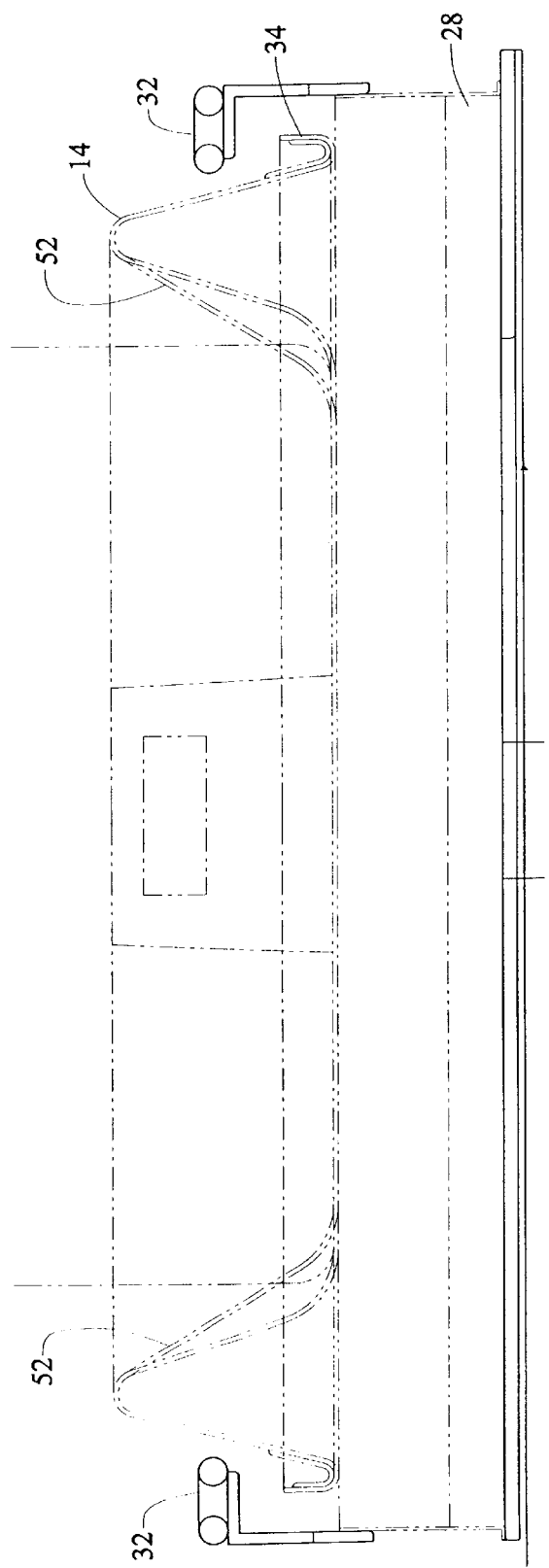
FIG. 3 is an enlarged side elevational view of a baggage tray on the tipper shown in FIG. 2.
Figure 4:
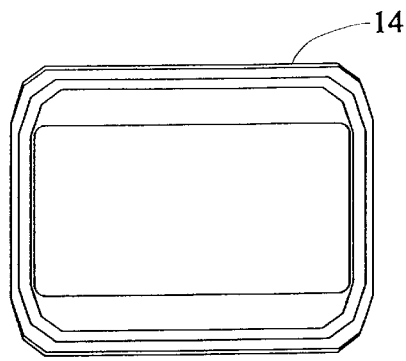
FIG. 4 is a top plan view of the baggage tray shown in FIG. 2.
Figure 5:
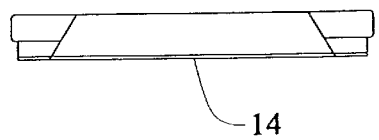
FIG. 5 is a side elevational view of the baggage tray shown in FIG. 2.
Figure 6:
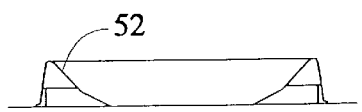
FIG. 6 is an end elevational view of the baggage tray shown in FIG. 2.

As seen in FIG. 2, the tipper 22 of the preferred embodiment of the subject invention comprises a section of belt conveyor 28 mounted on a movable platform 30 so that it can receive trays from the accumulation conveyor 18. The platform includes a leading edge 31 and a trailing edge 33. The platform 30 includes rail members 32, and a portion 34 of each tray 14 is positioned under these rails 32 when the tray 14 is on the tipper 22 to hold the tray on the tipper while it is being tipped. The platform 30 is mounted on two sets of wheels, a leading set 36 which is spaced apart by a first distance and a trailing set 38 spaced apart by a second distance. Due to the differences in the spacings between the wheels of these sets, separate supports 40, 42 are provided for each set of wheels. Both sets of supports include a first portion 44, 46 for supporting the platform 30 and belt conveyor 28 in a generally horizontal configuration. The supports 40 for the leading wheels 36 curve outwardly and downwardly from this first portion 44 while the supports 42 for the trailing wheels 38 are generally horizontal. Thus when the platform 30 is pushed in the direction of the leading wheels 36 by a suitable actuator 48, the leading edge 31 of the platform travels in a downward direction while the rear of the platform remains essentially at its original level. This causes the baggage tray 14 retained on the tipper 22 to tip forward and dump its contents into a receiving area 50 below. The actuator 48 then pulls the trailing edge 33 of the platform 30 back toward actuator 48 to return the platform to its original position. Unlike prior tippers where baggage was abruptly tipped from a tray, the present arrangement allows for a smoothly operating system that tips trays gradually to gently remove baggage therefrom. The curved or large radius interior walls 52 of the trays 14 contribute to this smooth transfer or tipping of baggage from the tray. A complete cycle of the tipping sequence is shown in FIGS. 8A–8J.

In addition to tipping the baggage trays gently, the actuator 48 driving the tipper 22 can be an ordinary rotary motor 54. The tipper 22 is moved from its horizontal start position, shown in FIG. 8A through a complete tipping cycle, and returned to its horizontal position with one rotation of the motor drive shaft 56. This is an improvement over prior art systems in which complex actuators were used to control the position and operation of the tipper. This improvement therefore makes tippers more economical to operate and build. The trailing edge 33 of the tipper platform 30 is hinged to a first rod 60 having a free end 62 which extends in the general direction of the motor 54. A second rod 58 is fixedly connected to the motor drive shaft 56 and rotates therewith. The end 59 of this second rod 58 is then connected to the free end 62 of the first rod 60 by a pin 63 or other mechanism which allows the connected ends of the rods to rotate about a common axis. As the second rod 58 rotates through the first 180 degrees of a motor cycle, the first rod 60 and hence the platform 30 is pushed in the direction of the leading edge 31 of the platform 30, away from the motor 54. This sequence is shown in FIGS. 8A–8E. Half way through a complete revolution of motor shaft 56, FIG. 8E, the platform 30 is in a generally vertical position so that any baggage in a tray on the platform will fall therefrom. As the second rod 60 continues to rotate with the drive shaft 54 back toward its start position, FIGS. 8E–8J, the first rod 60 is pulled in the direction of the trailing edge 33 of the platform 30, back toward the motor 54, until the platform 30 has returned to its original starting position when the motor has completed one cycle. Thus each cycle of the tipper corresponds to one cycle of the motor, and the position of the tipper can easily be controlled by controlling the motor and without the use of complicated linkages and controls.

Figure 9:
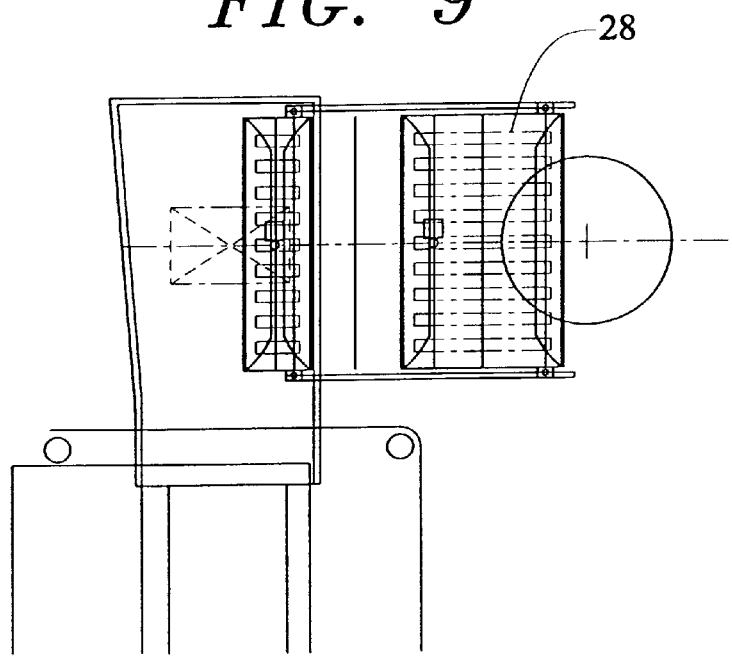
FIG. 9 is a top plan view of a second embodiment of a tipper according to the subject invention; and, FIG. 10 is a side elevational view of the tipper of FIG. 9.
Figure 10:
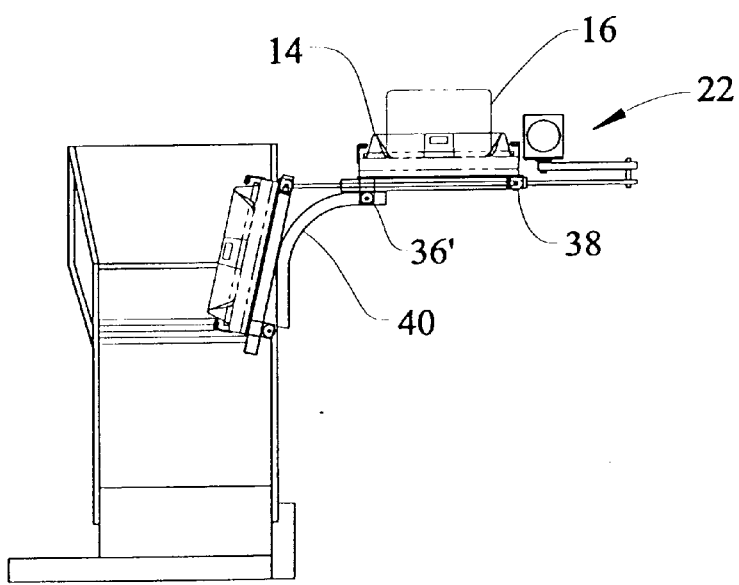

FIGS. 9 and 10 show a second embodiment of the present invention in which leading wheels 36 are located proximate to leading edge 31 of platform 30, but which is otherwise substantially identical to the tipper of the first embodiment. While support wheels 36, 36, and 38 have been described as wheel pairs, a single wheel, or three or more wheels could easily be substituted for these wheel pairs without exceeding the scope of this invention.

As such, an invention has been disclosed in terms of preferred embodiments thereof which fulfills each and every one of the objects of the present invention as set forth above and provides new and improved method and apparatus for high speed processing of articles.

Of course, various changes, modifications and alterations from the teachings of the present invention may be contemplated by those skilled in the art without departing from the intended spirit and scope thereof it is intended that the present invention only be limited by the terms of the appended claims.

What is claimed is:

1. A baggage handling system comprising:
   a plurality of baggage trays for carrying baggage;
   a first conveyor for transporting said trays at a given speed;
   at least one unloader for receiving the trays and for tipping the baggage out of the trays;
   an accumulation buffer between said first conveyor and said at least one unloader; and,
   a diverter for selectively diverting trays from said first conveyor onto said at least one accumulation buffer,
   wherein said trays can be unloaded by said unloader at a rate substantially independent of said speed.

2. A baggage handling system according to claim 1 including a stop that allows the trays to enter the unloader from the accumulation buffer one at a time at the rate.

3. A baggage handling system according to claim 2 including a second conveyor connected to said unloader for carrying said trays away from said unloader after the trays have been unloaded.

4. A baggage handling system according to claim 3 wherein said accumulation buffer has a first end adjacent to said first conveyor and a second end adjacent to said unloader, said second end being at a lower elevation than said first end.

5. A baggage handling system according to claim 4 wherein said second conveyor is at a lower elevation than said unloader.

6. A baggage handling system according to claim 5 wherein said accumulation buffer comprises a gravity-operated roller conveyor.

7. A baggage handling system according to claim 6 wherein said at least one unloader comprises a baggage tipper.

8. A baggage handling system according to claim 7 wherein said baggage tipper comprises:
   a generally horizontal platform having a front edge and a rear edge;
   a tipper conveyor mounted on said platform parallel to said front and rear edges and in alignment with said accumulation buffer;
   a holder for holding a baggage tray on said tipper conveyor;
   a pair of leading support wheels separated by a first distance;
   a pair of rear support wheels separated by a second distance;
   a first pair of wheel guides for supporting and guiding said leading support wheels, each of said first pair of wheel guides having a first end at a first elevation and a second end at a second elevation;
   a second pair of wheel guides for supporting and guiding said rear support wheels, said second pair of wheel guides being located generally at said first elevation and being generally horizontal; and,
   an actuator for moving said platform along said support wheel guides.

9. A baggage handling system according to claim 8 wherein said trays include edge portions for cooperating with said holder.

10. A device for unloading containers comprising:
    a generally horizontal platform having a front edge and a rear edge;
    a holder for holding a container on said platform;
    a first platform support;
    a guide for guiding said first platform support, said guide having a first end at a first level and a second end at a second level, said second level being lower than said first level;
    a second platform support for supporting said rear edge at a level higher than said second level; and,
    an actuator for moving said platform and said first platform support along said guide until said front edge support reaches said second end of said guide.

11. A device according to claim 10 wherein said first platform support comprises at least one wheel and said guide comprises at least one track for supporting said at least one wheel.

12. A device according to claim 11 wherein said at least one wheel comprises a pair of wheels separated by a first distance and said at least one track comprises a pair of tracks separated by said first distance.

13. A device according to claim 12 wherein said second platform support comprises first and second rear support wheels spaced apart by a second distance, said device further including guides for said first and second rear wheels.

14. A device according to claim 13 wherein guides for said first and second rear support wheels comprise first and second tracks spaced apart by said second distance.

15. A device according to claim 14 wherein said actuator comprises a motor having a driveshaft connected to said platform by an arm.

16. A device according to claim 15 wherein said motor moves said platform in a first direction during one half of its cycle and in a second direction during the second half of its cycle.

17. A device according to claim 15 wherein said rear support tracks are generally horizontal and located at said first level.

18. A device according to claim 10 further including a conveyor mounted on said platform extending in a direction parallel to said front and rear edges.

19. A baggage tipper for tipping baggage trays comprising:
    a generally horizontal platform having a front edge and a rear edge;
    a conveyor mounted on said platform parallel to said front and rear edges;
    a holder for holding a baggage tray on said conveyor;
    a pair of front support wheels separated by a first distance;
    a pair of rear support wheels separated by a second distance;
    a first pair of wheel guides for supporting and guiding said front support wheels, each of said first pair of wheel guides having a first end at a first elevation and a second end at a second elevation;

a second pair of wheel guides for supporting and guiding said rear support wheels, said second pair of wheel guides being located generally at said first elevation and being generally horizontal; and, a linear actuator for moving said platform along said support wheel guides.

20. A method of handling baggage comprising:

a) transporting baggage trays carrying baggage on a conveyor at a first speed;

b) selectively diverting the baggage trays transported on the conveyor to an accumulation buffer to form an accumulated line; and c) unloading baggage from the diverted trays at a second speed independent of the speed of the conveyor using an unloader for receiving the trays and for tipping the baggage out of the trays.

21. The method of claim 20 further including allowing the trays to enter the unloader from the accumulation buffer one at a time at the second speed.

22. The method of claim 20, wherein the second speed is at a generally constant rate.

23. The method of claim 20, comprising tipping each tray to unload the baggage.

24. The method of claim 23, wherein a forward portion of the tray travels along an arcuate and downward path during unloading.

25. The method of claim 24, wherein a rearward portion of the tray travels in a generally horizontal path during unloading.

26. A baggage handling system according to claim 2, wherein the stop is adapted to stop the trays before the trays enter the unloader to ensure that the trays enter the unloader from the accumulation buffer one at a time at the rate.

27. A baggage handling system according to claim 2 including a second conveyor connected to said unloader for carrying said trays away from said unloader after the trays have been unloaded.

28. The method of claim 21 further including stopping the trays before the trays enter the unloader to ensure that the trays enter the unloader from the accumulation buffer one at a time at the second speed.

\* \* \* \* \*